Jan. 21, 1969   K. E. McCONNAUGHAY   3,423,222
METHOD OF MAKING A PAVING COMPOSITION
Filed May 10, 1965
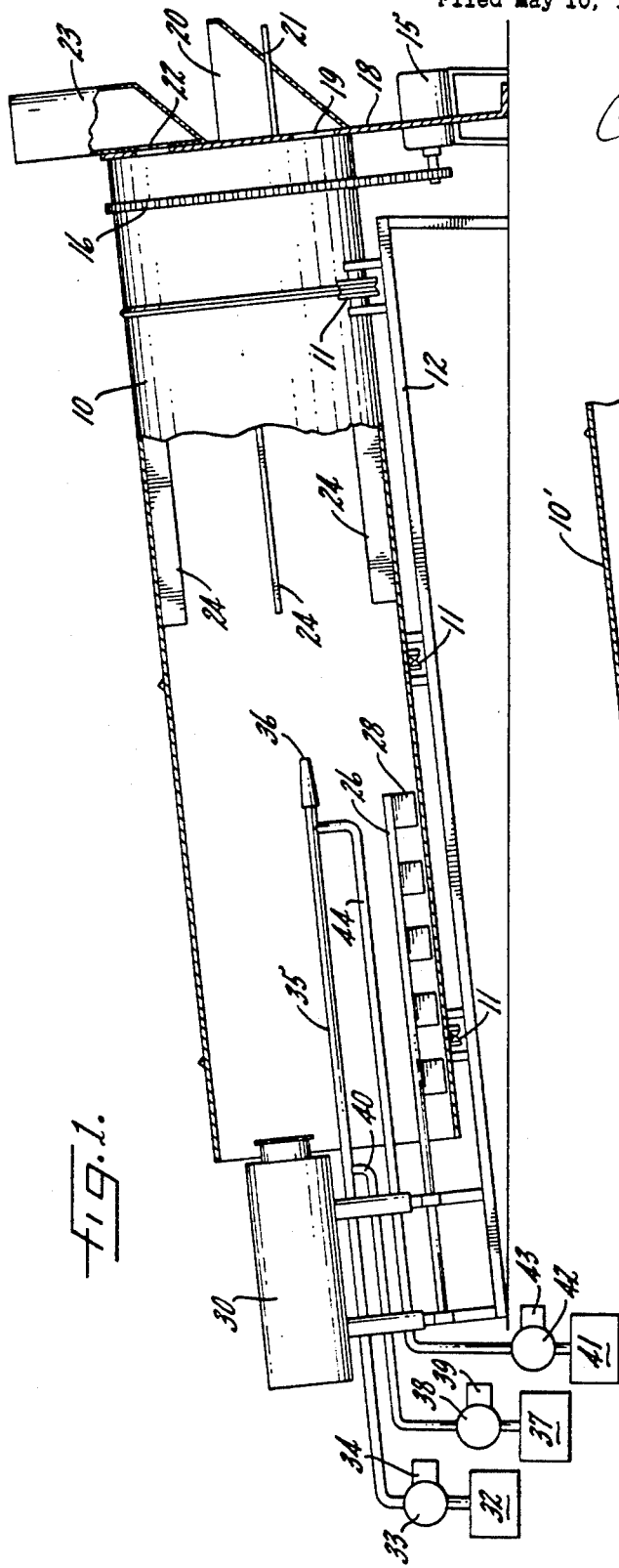
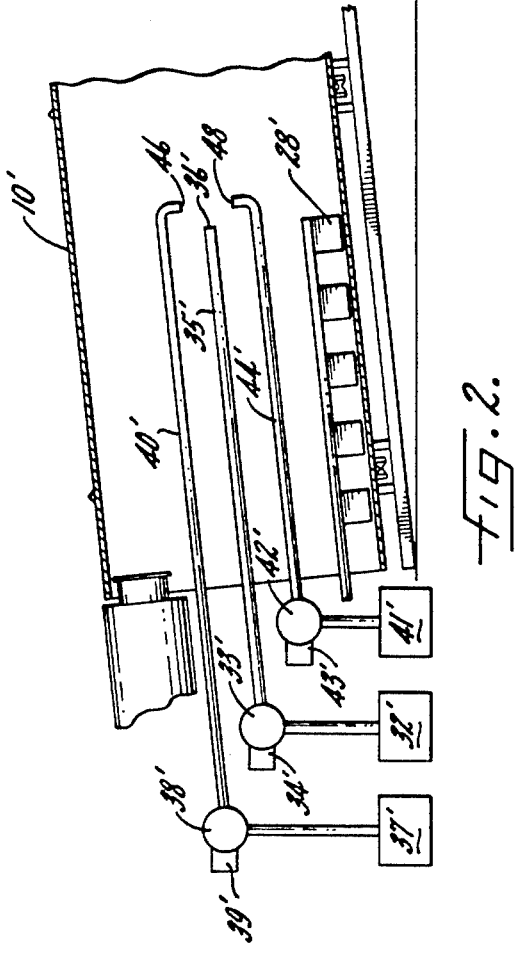
INVENTOR.
KENNETH E. McCONNAUGHAY,
BY
Trask, Jenkins & Hanley
ATTORNEYS.

United States Patent Office 3,423,222
Patented Jan. 21, 1969

3,423,222
METHOD OF MAKING A PAVING COMPOSITION
Kenneth E. McConnaughay, P.O. Box 871,
Lafayette, Ind. 47902
Filed May 10, 1965, Ser. No. 454,459
U.S. Cl. 106—278                      8 Claims
Int. Cl. C09d 3/24; C09d 11/00; C08h 17/16

ABSTRACT OF THE DISCLOSURE

A method of making a paving composition in which a turbulent dispersion at a temperature of at least 212° F. and containing from about 85% to about 95% of a thermoplastic binder and from about 5% to about 15% water is discharged onto an aggregate. Said dispersion and aggregate are mixed together while being heated to remove at least portions of said water from the resulting paving composition.

---

This invention relates to a method of making a paving composition in which a bituminous or other thermoplastic binding material is mixed with an aggregate.

It has hereto been the practice that when the aggregate which was to be used in forming a bituminous paving composition was wet or cold or both wet and cold, the bituminous binder which was mixed with it had to be treated to form an emulsion or it had to be cut-back with a solvent. It was frequently necessary in order to obtain a satisfactory cohesive composition to also treat the aggregate with a primary coating of a wetting agent or to dry it and heat it. To this end, it has been proposed to mix emulsified asphalt with wet or dry aggregate and then subject the mixture to heat in the form of a flame or heated gas while said mixture is being agitated to thus remove the water in the aggregate and the water from the emulsion, as described in my U.S. Patent No. 2,626.875. This method has certain disadvantages. If the emulsion is an anionic or cationic emulsion in which asphalt is the dispersed phase, it necessarily contains at least 25% water which must be removed from the mixture of the emulsion and aggregate. If, on the other hand, an inverted emulsion is employed using a combination of oil and water with a bitumen, both the oil and the water must be removed to obtain the basic bituminous material, and such an inverted emulsion of asphalt and water is not capable of being heated for transfer and proportioning. Further, such emulsions must be made in an emulsifying mill to form uniform dispersions which will be stable upon storage and transportation. Such milling increases the cost of producing the emulsions and thus the cost of the resulting paving composition made therewith.

It is an object of the present invention to provide a method of making a bituminous or other thermoplastic paving composition which will overcome the difficulties and disadvantages discussed above. More specifically, it is an object of the invention to provide an improved method of making a paving composition which will provide a complete dispersion of the binding material throughout an aggregate, which will provide an improved coating of the aggregate fines, which will provide an inert mixing atmosphere to reduce the fire hazard and hardening or oxidizing conditions attendant to the production of a bituminous or other thermoplastic paving composition, which will provide a paving composition having improved workability at lower temperatures, which will permit the use of various chemical and other additives to improve coating and adhesion to aggregate and the bitumen or other thermoplastic binder itself, and which can be carried out on an inexpensive basis.

In carrying out the invention in its preferred form, the aggregate to be coated is placed in a chamber into which heat, in the form of radiant heat, a flame, heated gas, or the like is introduced. The thermoplastic binder and water, which are proportioned relative to one another to provide a bitumen-water mixture of the desired characteristics, are simultaneously introduced into the chamber in proximate relation to each other, such as at the same point or at points immediately adjacent to one another. The bitumen is heated to a temperature sufficient to cause the bitumen-water mixture to be discharged into the chamber as a dispersion or turbulent mass. The temperature causes the water to be uniformly dispersed throughout the bitumen and the dispersion to be discharged into the chamber in the form of a turbulent mass or cloud depending on the temperature of the asphalt. This turbulent mass or cloud is mixed with the aggregate to uniformly disperse the bitumen throughout the aggregate and provide a uniform coating thereover. The elevated temperature in the chamber causes any residual moisture in the dispersion to evaporate off and thus form an inert atmosphere within the chamber to reduce the possibility of hardening and/or igniting the bitumen. After the dispersion has been mixed with the aggregate sufficiently to insure uniform coating of the bitumen over the aggregate, the resultant paving composition is withdrawn from the chamber.

The accompanying drawing illustrates an apparatus which may be employed for carrying out the invention. In such drawing:

FIG. 1 is a side elevation of a mixing chamber with portions thereof being broken away; and FIG. 2 is a side elevation of the mixer of FIG. 1 but with portions thereof being broken away to show a modified form of the method of adding the binder-water mixture to an aggregate.

This invention is concerned with the method of making a paving composition employing an aggregate and a thermoplastic binder. The binder is formed as a dispersion of water and a thermoplastic material which may be a synthetic one, a bituminous material, a tar or a pitch. Examples of such thermoplastic materials are asphalt, tar, residues from tall oil distillation, synthetic or natural resins, plastic binders, and the like.

The process may be carried out in a mixer of the type shown in FIG. 1 which comprises a chamber in the form of a drum 10 supported for rotation about an inclined axis by rollers 11 on a frame 12. The drum may be rotated by any convenient means, the means illustrated comprising an electric motor 15 operatively connected to the drum by a chain drive 16.

A plate 18 is supported in a fixed position to cover the inlet end of the drum and is provided adjacent the lower portion of the drum with an opening 19 through which aggregate may be admitted to the drum from a hopper or chute 20 provided with a reciprocating or continuous feeder 21. Opposite the upper portion of the drum, the plate 18 is provided with an exhaust opening 22 communicating with an exhaust stack 23. The aggregate is repeatedly elevated and dropped during rotation of the drum by a plurality of longitudinally extending flights 24 mounted on the inner drum face. Said flights extend from the inlet end of the drum inwardly toward the discharge end of said drum, but terminate well inwardly from the discharge end.

Supported from the frame 12 at the discharge end of the drum 10 and extending axially inwardly of the drum is a blade-supporting member 26 which, within the drum, carries a series of downwardly extending mixing blades 28 adapted to stir and mix the aggregate in the lower portion of the drum. Said blades may or may not be used since the aggregate and binder may be mixed sufficiently by tumbling as the drum rotates. Also supported from the frame 12 is a burner 30 or other means for injecting heat in the form of a flame, heated gas, radiant heat, or the like, into the drum 10. Desirably, the burner is mounted axially of the drum in a position to discharge said heat into the drum towards the exhaust opening 22. The heat emitted from the burner 30 maintains the temperature in the drum adjacent the discharge portion of said drum at a temperature of from about 1000° F. to about 2000° F.

The thermoplastic binding material is introduced into the mixer 10 adjacent the discharge end thereof upstream from the mixing blades 28, but may, if desired, be introduced at the inlet and with the aggregate. In the device shown in FIG. 1, the binder is pumped from a reservoir 32 by means of a pump 33 driven by a motor 34 through a conduit 35 having an outlet 36 disposed within the mixer upstream of the blades 28. Water is pumped from a reservoir 37 by a pump 38 driven by a motor 39 through a conduit 40 connected to the conduit 35 upstream from the outlet 36 of the conduit 35. Certain chemicals or wetting agents to be incorporated in the paving composition can be put into solution in the water in the reservoir 37 and thus be mixed with the binder simultaneously with the water. Alternatively, said chemicals or wetting agents can be placed in solution or dispersed in oil or water in a reservoir 41 and then pumped by means of a pump 42 driven by a motor 43 through a conduit 44 connected to the conduit 35 upstream from the discharge outlet 36.

It is essential to the operation of the instant invention that the binder-water mixture discharged from the outlet 36 be at a temperature sufficient to create a turbulent mass of the dispersion. I have found that the optimum discharge temperature is about 220° F. so that the water is discharged in a vaporized state and the turbulent mass is in the form of a cloud. In order to discharge the mixture at this elevated temperature, the binder moving through the conduit 35 should have a temperature in the range of from about 230° F. to about 350° F., and the water moving through the conduit 40 should have a temperature in the range of from about 40° F. to about 210° F. The binder and water are combined in proportions of from about 5% to about 15% water and from about 85% to about 95% binder. Where chemicals or wetting agents are added as a separate solution as through the conduit 44, the amount of water in such solution will constitute a fraction of the total amount of water added to the binder. In other words, the amount of water added through the conduit 40 should be decreased proportionately to the amount of water contained in the solution introduced through the conduit 44. The water, of course, may comprise more than 15% of the mixture, but in such case it will merely necessitate the removal of more water from the resultant composition.

With the dispersion exiting the outlet 36 at an elevated temperature to create turbulence the water will be dispersed throughout the binder. If the dispersion exits above 212° F. the water will form a turbulent cloud of the binder within the drum 10. The heat discharged from the burner 30 will not only cause any moisture in the aggregate to be removed therefrom but will further cause the desired amount of water in the injected dispersion to be removed and exhausted through the stack 23 as a vapor. The water vapor present within the drum will further prevent the binder from igniting and will reduce the hardening which normally occurs under the influence of the elevated temperature within the drum. Because of the turbulence caused by the water coming in contact with the hot binder within the conduit 35 and at the discharge outlet 36, said water will be dispersed throughout the binder and will cause a dispersion of the chemicals or wetting agents in said binder.

The mass or cloud discharged from the outlet 36 will be mixed with the aggregate by rotation of the drum and the blades 28 so that the binder forms a coating over the individual particles of the aggregate, the turbulence created by reason of the dispersion being discharged as a cloud facilitating said coating. The resulting paving composition will be discharged from the mixer at temperatures up to approximately 400° F., the discharge temperature being controlled by the amount of heat added to the mixer by the burner 30, by the amount of water to be evaporated, and by the dwell time of the composition within the mixer. Because the amount of water introduced into the mixture is controlled, there will be less water to be evaporated from the dispersion than if a bituminous emulsion was used as the binder.

It is essential to the operation of the invention that the addition of the heated binder and water occur at the same point as illustrated in the apparatus shown in FIG. 1 or at points in closely spaced relationship to each other as shown in the apparatus in FIG. 2. In the apparatus shown in FIG. 2, the binder-water dispersion, as well as any chemical agents, is introduced into the mixer 10' upstream from the end of the mixing blades 28'. The heated binder is pumped from the reservoir 32' by a pump 33' driven by a motor 34' through a conduit 35' provided with a discharge outlet 36'. The water, which may or may not be heated and which may or may not contain additives, is pumped from the reservoir 37' by a pump 38' driven by a motor 39' through a conduit 40' provided with an outlet 46 located immediately adjacent the outlet 36'. If additives are to be employed in the composition, and they are not introduced with the water through the conduit 40', said additives are pumped from a reservoir 41' by means of a pump 42' driven by a motor 43' through a conduit 44' provided with a discharge outlet 48 immediately adjacent the outlets 36' and 46. The outlets 36', 46, and 48 may or may not be provided with atomizing nozzles, as desired. In this manner, the binder, water, and additives are simultaneously introduced together into the mixer 10' to form a turbulent mass or cloud of the heated dispersion which will react within the mixer in the same manner as the dispersion introduced in the manner shown in FIG. 1.

In each of the mixers shown in FIGS. 1 and 2 it is contemplated that the processing will be carried out on a continuous basis wherein the aggregate will be continuously fed into the mixer and the dispersion will be continuously discharged thereon with the resulting paving composition being withdrawn on a continuous basis from the discharge outlet of the mixer.

The following examples illustrate various paving compositions that have been prepared according to the invention.

Example 1

An 85–100 penetration asphalt at a temperature of 285° F. was mixed with water, crude tall oil, and caustic soda all at 70° F. These materials were proportioned into a discharge conduit leading into a mixer according to the following proportions: 90% asphalt, 7.95% water, 1.8% crude tall oil, and .25% caustic soda. The water and caustic soda were added to the asphalt through a common conduit, and the crude tall oil was added through a separate conduit. If desired, the crude tall oil could be added through the conduit carrying the asphalt.

Example 2

An 85–100 penetration asphalt having a temperature of 285° F. was mixed with water, vinsol resin, and caustic soda all at 70° F. These materials were proportioned into the discharge conduit leading into a mixer according to the following proportions: 90% asphalt, 8.9% water, 1% vinsol resin, and .1% caustic soda. The water, vinsol resin, and caustic soda in solution in water were each added to the asphalt-carrying discharge conduit through a common conduit.

Example 3

An 85–100 penetration asphalt at a temperature of 285° F. was mixed with water, imidazoline, and hydrochloric acid all at 70° F. These materials were proportioned into a discharge conduit leading into a mixer according to the following proportions: 90% asphalt, 9.7% water, .23% imidazoline, and .07% hydrochloric acid. The water, imidazoline, and hydrochloric acid were each added to the asphalt-carrying discharge conduit through separate conduits.

Example 4

An 85–100 penetration asphalt at a temperature of 285° F. was mixed with water, crude tall oil, and triethanolamine all at 70° F. These materials were proportioned into a discharge conduit leading into a mixer according to the following proportions: 90% asphalt, 7.9% water, 1.5% crude tall oil, and .6% triethanolamine. The water, crude tall oil, and triethanolamine, were each added to the asphalt-carrying discharge conduit through separate conduits.

Example 5

An 85–100 penetration asphalt at a temperature of 285° F. was mixed with water at a temperature of 70° F. The asphalt and water were mixed together to form a dispersion containing 92.1% asphalt and 7.9% water and introduced into a mixer.

Example 6

An RT 12 tar (ASTM coal tar) at a temperature of 200° F. was mixed with water at a temperature of 100° F. The tar and water were mixed together in a discharge conduit to form a dispersion containing 85% tar and 15% water which was discharged into the mixer.

Example 7

Tall oil pitch having a penetration of 85 and at a temperature of 200° F. was mixed with caustic soda and water at 100° F. These materials were proportioned into a discharge conduit leading into a mixer according to the following proportions: 87% tall oil pitch, 2.5% caustic soda, and 10.5% water. The caustic soda and water were added in a common conduit to the tall oil pitch.

The dispersion described in each of the foregoing examples may be treated with from about .1% to about 2%, based on the weight of the binder, of adhesion promoters such as amines, imidazolines, chlorosilanes, aluminum sulfate, copper sulfate, metal soaps such as iron and lead naphthanates, soluble and insoluble chromates and dichromates, hydrochloric, acetic, and sulfuric acids, and the like, and mixtures thereof. The dispersions described in each of the foregoing examples may also be treated with from about .5% to about 10%, based upon the weight of the binder and depending upon the results desired, with cohesion promoters, such as pumpable slurries or dispersions of asbestos, slate flour, mineral filler, powdered hydrated lime, powdered aphalt, powdered rubber, powdered metals, flay ash, carborundum powder, petroleum and other resins and polymers, china clay, portland cement, bentonite, bentone and rubber latex, either natural or synthetic, and mixtures thereof. Many of these materials cannot be employed in paving compositions employing conventional bituminous emulsions. For example, the asbestos destroys most anionic emulsions as do acids and metal soaps. Lime and cement destroy cationic emulsions. All of these additives may be proportioned through separate conduits into the binder-carrying discharge conduit for mixing and dispersion throughout the binder prior to its introduction into the mixer, or they may be added to the binder-water dispersion through separate conduits as said dispersion is injected into the mixer.

While the combining of the dispersion and the aggregate has been described herein as being carried out in a mixer, it is to be understood that such combining and mixing can be carried out in situ, as in an apparatus of the type described in my U.S. Patent No. 3,025,773 with the addition of mixing elements under the hood. For example, a layer of aggregate may be placed on a road and the heated dispersion blown thereover in the presence of heat with discs, harrows, rotary mixers, blades, or the like mixing the dispersion and aggregate together.

I claim:

1. A method of making a paving composition, comprising the steps of simultaneously discharging onto an aggregate a thermoplastic binder and water, said binder and water being mixed together as they are being discharged to form a dispersion of the binder and water on the aggregate, said dispersion being discharged onto said aggregate at a temperature of at least 212° F. and containing from about 5% to about 15% water and from about 85% to about 95% thermoplastic binder, and mixing said dispersion and aggregate together while heating said aggregate and dispersion in an environment from 1000° F. to 2000° F. whereby said aggregate will coat said aggregate and sufficient amounts of the water will be removed therefrom to prevent said binder from igniting and hardening during said mixing.

2. A method of making a paving composition as set forth in claim 1, in which said water contains from about .1% to about 2%, based upon the weight of the thermoplastic binder, of an adhesion promoter.

3. A method of making a paving composition as set forth in claim 1 in which said water contains from about .5% to about 10%, based upon the weight of the thermoplastic binder, of a cohesion promoter.

4. A method of making a paving composition as set forth in claim 1 in which said water contains from about .1% to about 2%, based upon the weight of the thermoplastic binder, of an adhesion promoter, and from about .5% to about 10%, based upon the weight of the thermoplastic material, of a cohesion promoter.

5. A method of making a paving composition, comprising the steps of introducing an aggregate into a mixer, simultaneously introducing into said mixer a thermoplastic binder having a temperature in the range from about 200° F. to about 350° F. and water having a temperature in the range of from about 40° F. to about 210° F., whereby said thermoplastic binder and water are combined as they are introduced into said mixer to form a dispersion in the form of a cloud within said mixer, said dispersion comprising from about 85% to 95% of said thermoplastic binder and from about 5% to about 15% of said water, mixing said dispersion and aggregate together while heating said dispersion and aggregate whereby said binder will coat said aggregate and a sufficient amount of said water will be removed from said dispersion to prevent said binder from igniting and hardening during said mixing, and discharging the resulting paving composition from the mixer at a temperature up to 400° F.

6. The invention as set forth in claim 5 in which said thermoplastic binder and water are introduced into said mixer in proximate relation to each other through separate conduits.

7. The invention as set forth in claim 5 in which said thermoplastic binder and water are introduced into said mixer through a common conduit and are combined in said conduit.

8. A method of making a paving composition as set forth in claim 6 in which said mixing and heating step comprises mixing said dispersion and aggregate together in the presence of said heated air and flames.

References Cited

UNITED STATES PATENTS 2,626,875  1/1953  McConnaughay _____ 106—277
3,270,631  9/1966  Bower _____ 106—277

FOREIGN PATENTS 258,870  6/1927  Great Britain.

JULIUS FROME, *Primary Examiner.*
JOAN B. EVANS, *Assistant Examiner.*

U.S. Cl. X.R.

106—96, 282, 283

UNITED STATES PATENT OFFICE
CERTIFICATE OF CORRECTION

Patent No. 3,423,222  January 21, 1969

Kenneth E. McConnaughay

It is certified that error appears in the above identified patent and that said Letters Patent are hereby corrected as shown below:

Column 6, line 28, "aggregate" should read -- binder --.

Signed and sealed this 17th day of March 1970.

(SEAL)
Attest:

Edward M. Fletcher, Jr.
Attesting Officer

WILLIAM E. SCHUYLER, JR.
Commissioner of Patents